March 28, 1939.    H. W. FAEBER    2,152,137
APPARATUS FOR STITCHING ASSEMBLIES
Filed Feb. 8, 1938    6 Sheets-Sheet 5
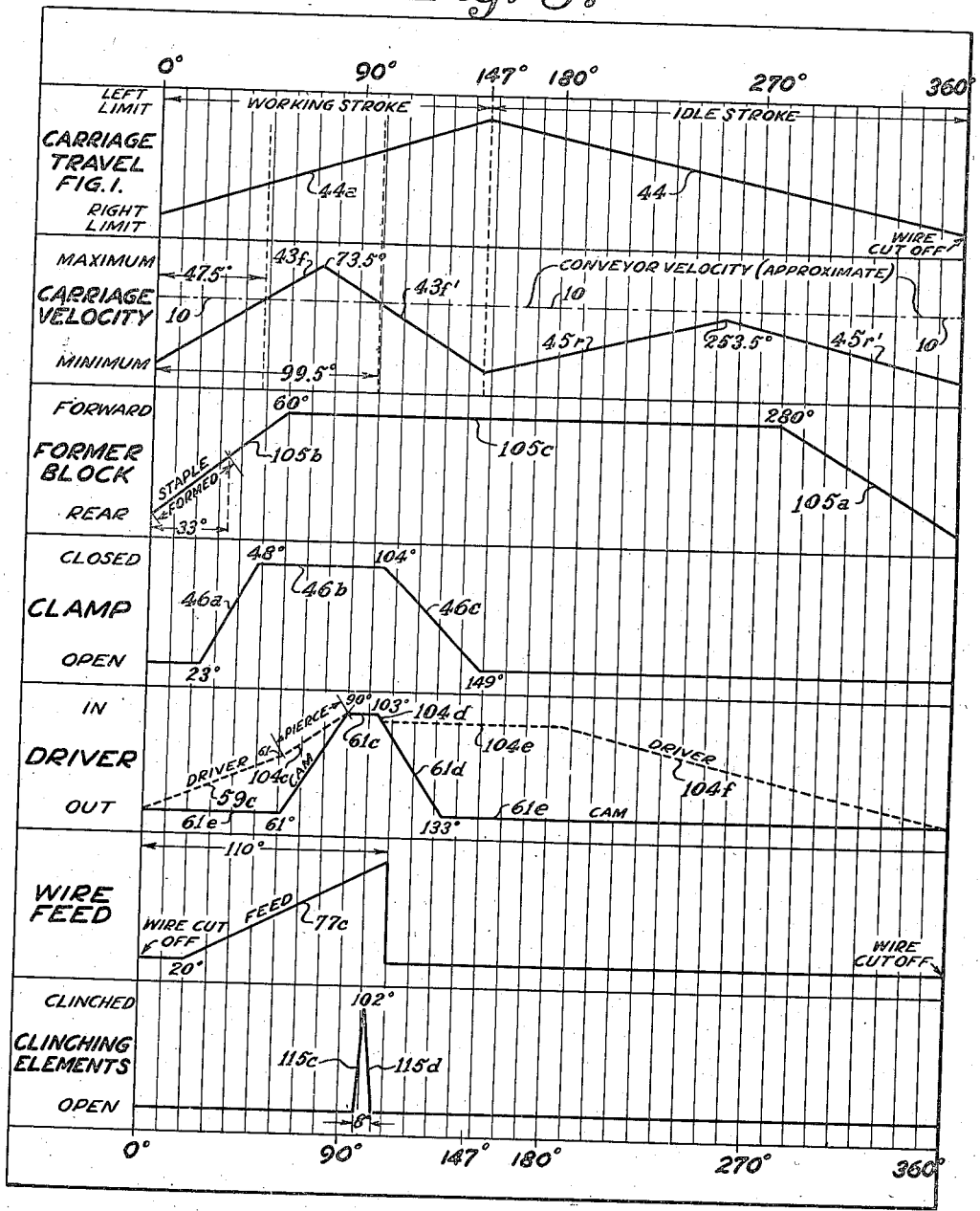
INVENTOR.
Harry W. Faeber
BY
Cornelius D. Ehret
ATTORNEY.

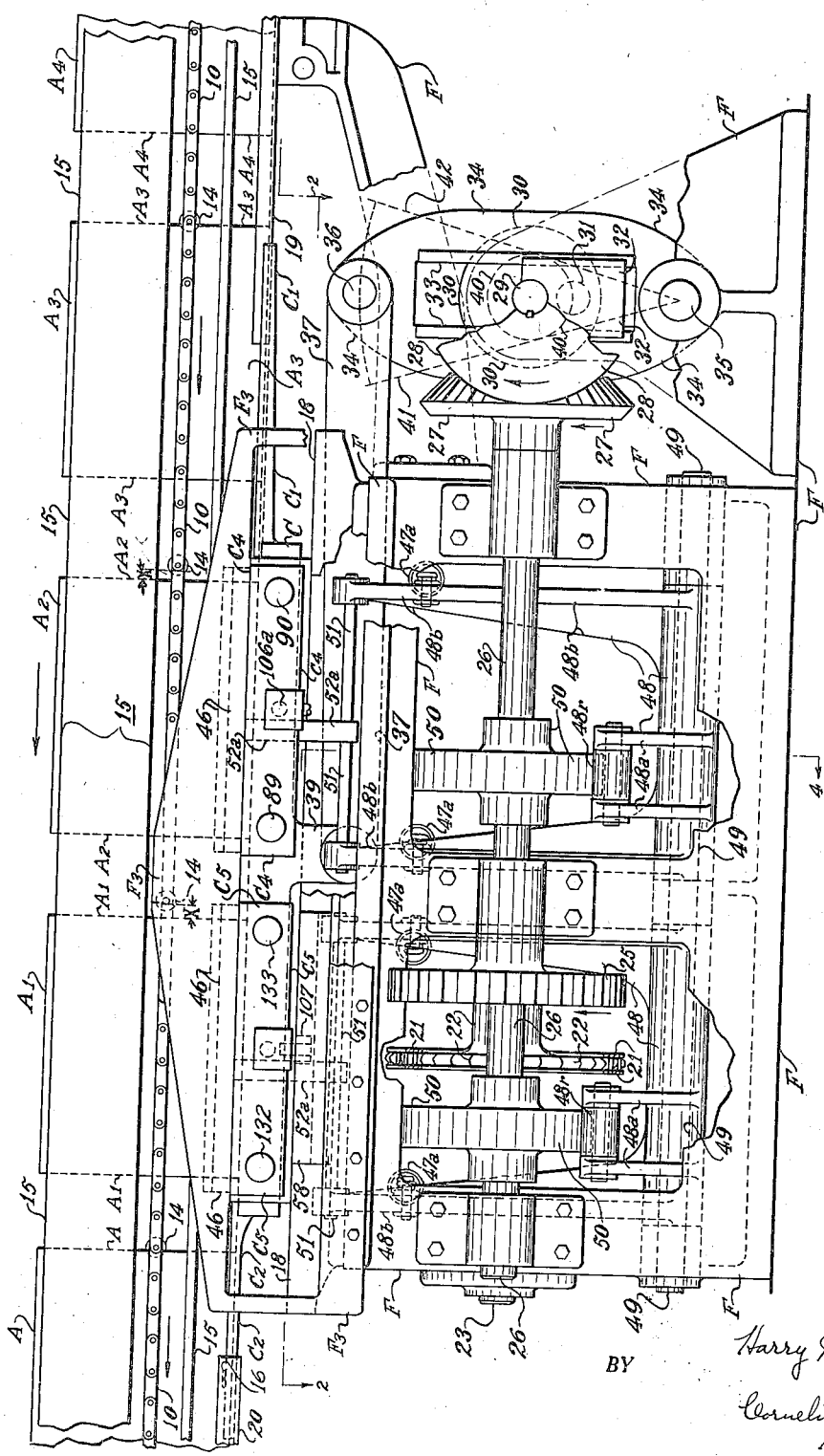

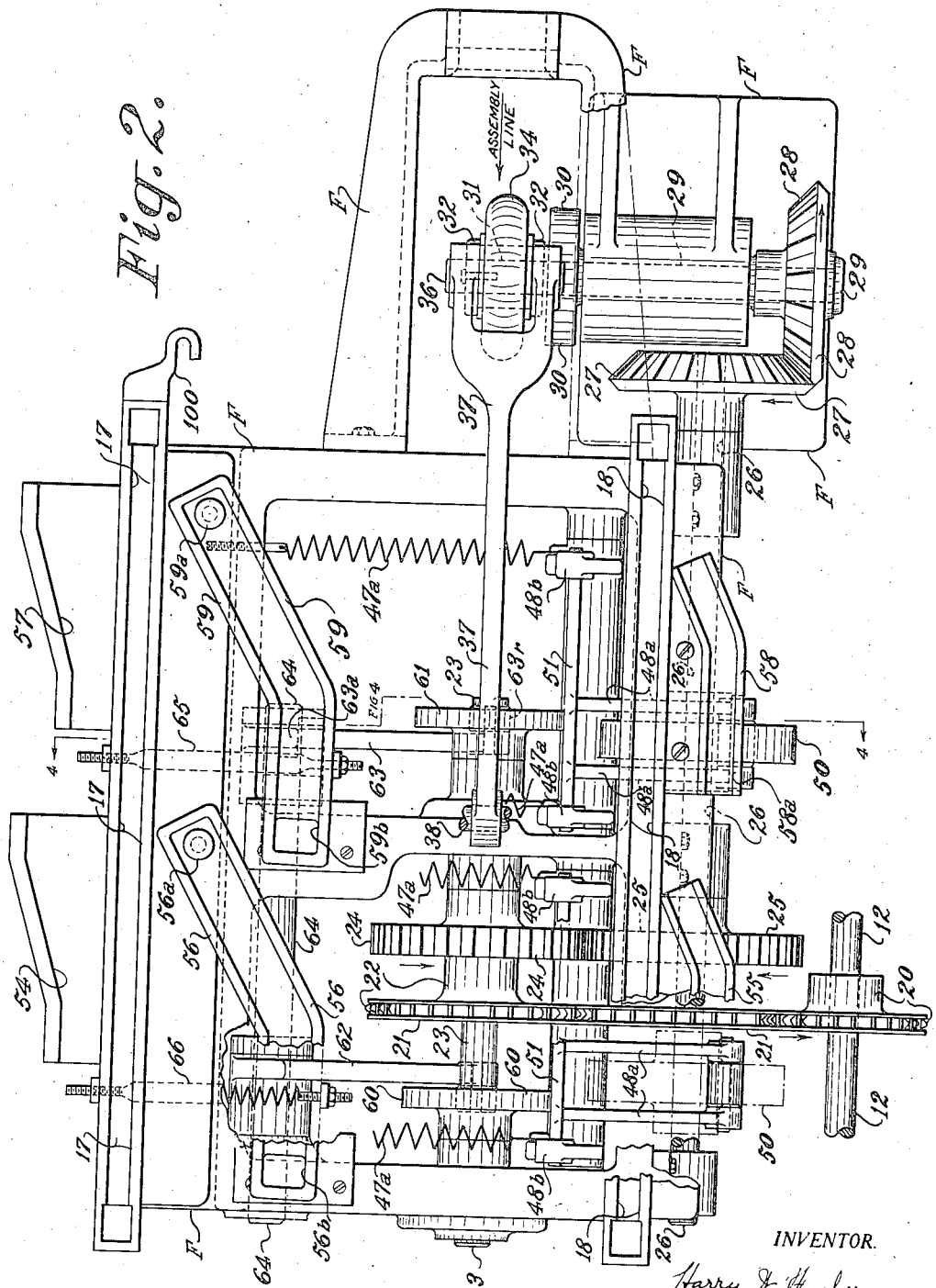

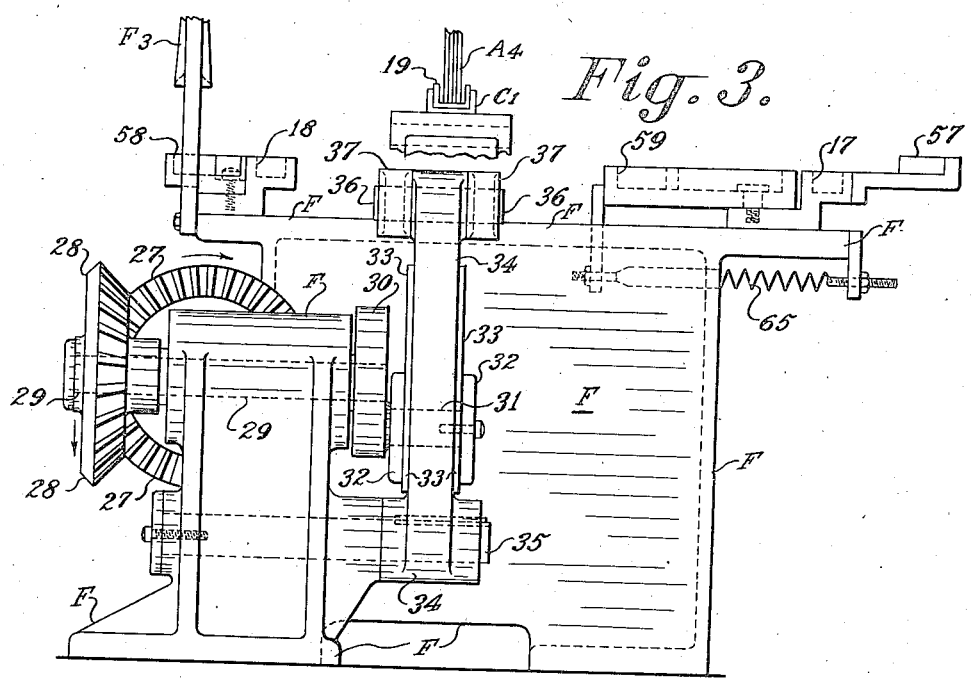
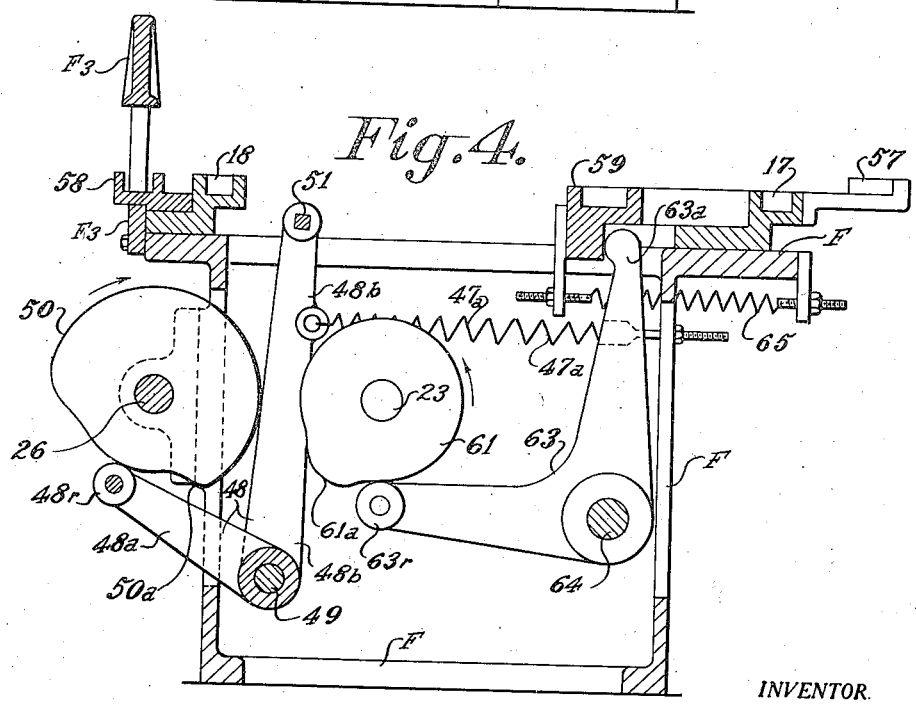

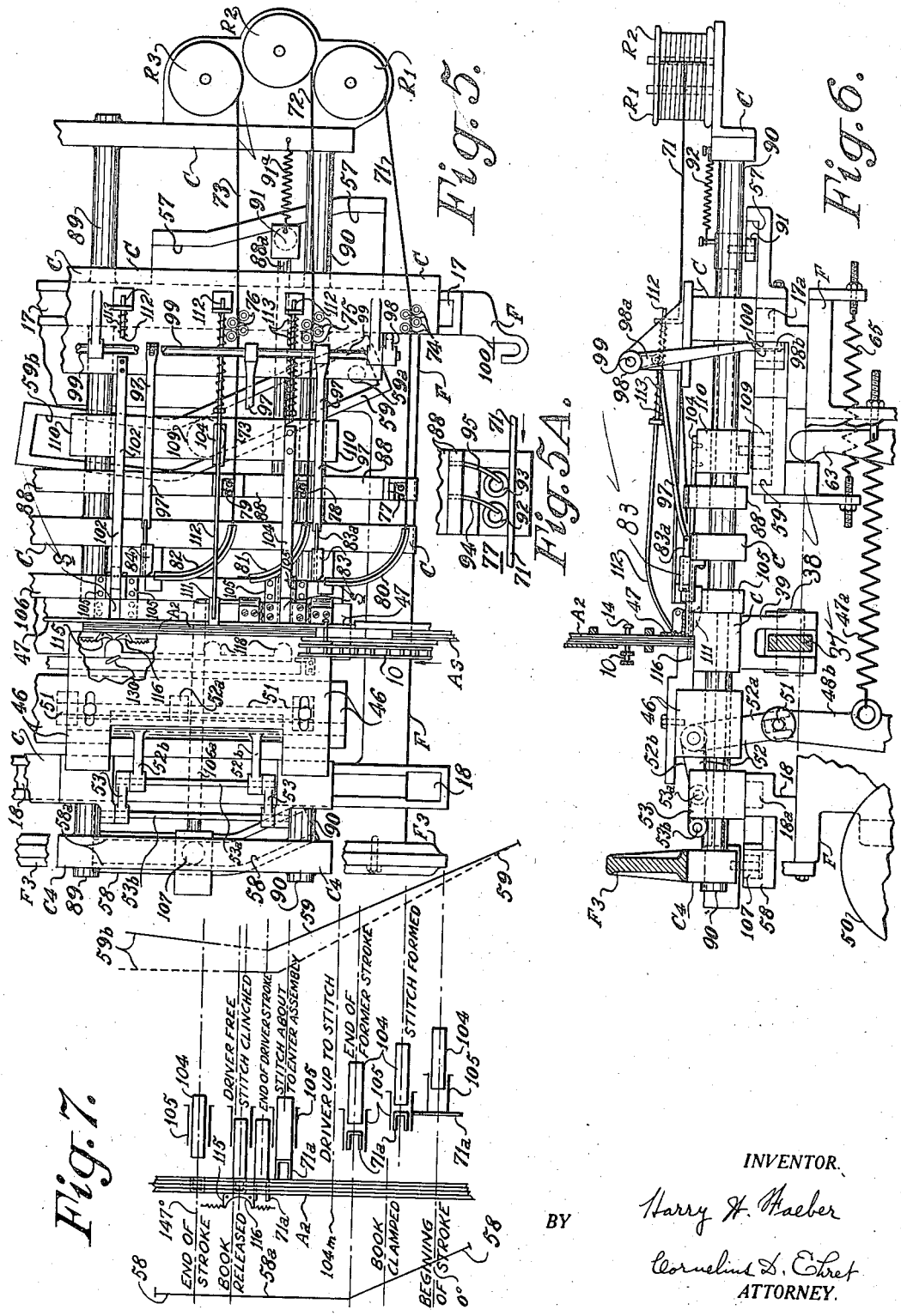

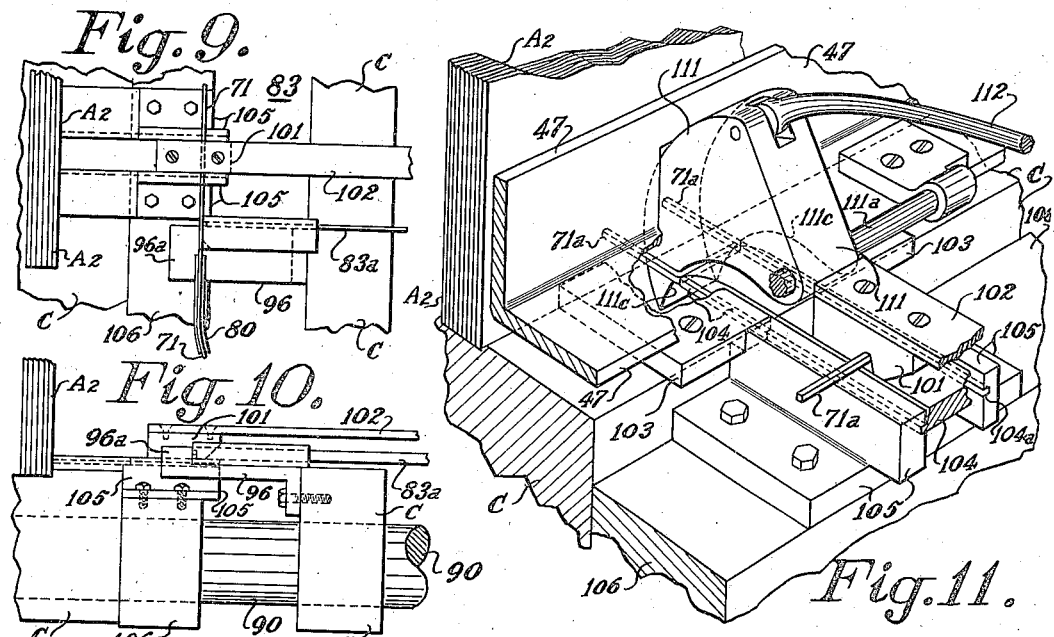
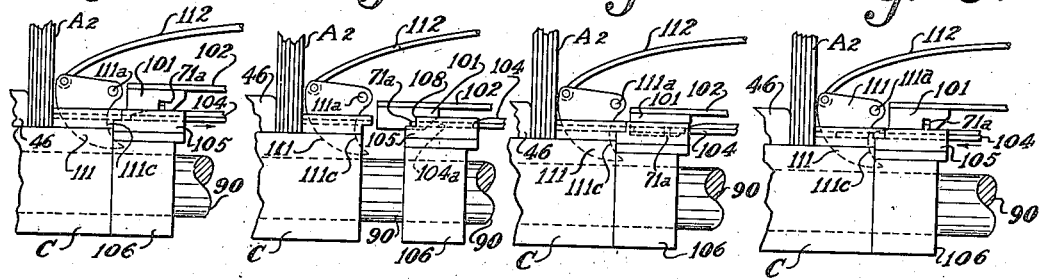
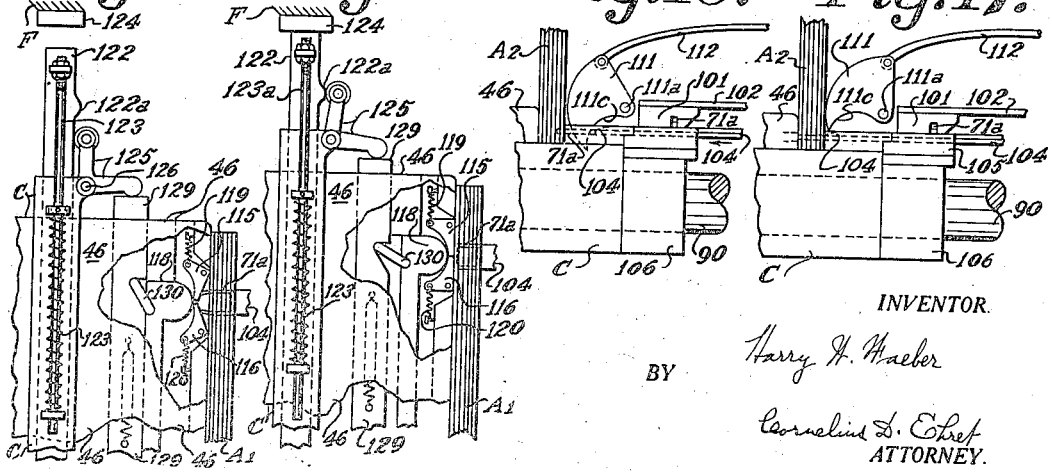

Patented Mar. 28, 1939

2,152,137

UNITED STATES PATENT OFFICE 2,152,137

APPARATUS FOR STITCHING ASSEMBLIES

Harry W. Faeber, Philadelphia, Pa., assignor to The Cuneo Eastern Press, Inc., Philadelphia, Pa., a corporation of Pennsylvania Application February 8, 1938, Serial No. 189,411

16 Claims. (Cl. 1—7)

My invention relates to production of books, including periodicals, magazines, and the like, and in particular relates to apparatus for stitching or binding to each other loose signatures (which term herein includes single and/or multi-leaf signatures) to form stitched or bound assemblies.

In accordance with my invention, a succession or series of loose or unbound assemblies of signatures is continuously passed at uniform or substantially constant speed through a stage in which, during the cycle of reciprocation of a carriage for stitching mechanism, are performed the operations of stitching or binding the loose signatures to each other, and correlated operations, all completed during the working or active part of each of a corresponding succession or series of cycles, and which working part is of materially shorter duration or smaller than the remainder or idle portion of the cycle; during which longer or idle portion of each cycle preparation is made for repetition of the aforesaid operations upon the next succeeding assembly in the working or active part of the next succeeding cycle; more particularly, the assemblies may be operated upon during the short working or active part of the cycle as aforesaid in groups, each group comprising two or more assemblies which are simultaneously operated upon, and the aforesaid materially greater remainder or idle portion of each cycle is of at least such extent or duration that within it the group of assemblies last operated upon passes out of and the next group to be operated upon passes into aforesaid stage.

Further in accordance with my invention, the stitching or binding operations, and at least some of the correlated operations, are performed materially in advance of the end of the aforesaid short working or active portion of each cycle.

My invention resides in further aspects of method and apparatus hereinafter described.

For an illustration of methods and apparatus comprehended by my invention, reference is had to the accompanying drawings, in which:

Fig. 1 is a side elevation, with parts broken away, of apparatus embodying my invention;

Fig. 2 is a plan view, with parts broken away, taken on the line 2—2 of Fig. 1;

Fig. 3 is an end elevation, with parts broken away, of parts of Fig. 2;

Fig. 4 is a sectional view, with parts omitted, taken on the line 4—4 of Fig. 2;

Fig. 5 is a fragmentary plan view, with parts broken away, of structure shown in Fig. 1;

Fig. 5A is an enlarged fragmentary plan view of a wire-feeder (77) shown directly above in lower center of Fig. 5;

Fig. 6 is a side elevation of structure shown in Fig. 5 with parts omitted and some shown in section;

Fig. 7 diagrammatically illustrates the timing of the stitching operations performed by each of the stitching mechanisms S shown disposed along assembly A2 in Fig. 5;

Fig. 8 is a chart illustrative of operations of significant parts of a typical embodiment of my invention;

Fig. 9 is a fragmentary plan view on enlarged scale of wire-severing mechanism (83) of Figs. 5 and 6;

Fig. 10 is a front elevation of structure shown in Fig. 9;

Fig. 11 is a fragmentary view, in perspective, of a staple-forming and driving mechanism S, Fig. 5;

Fig. 12 is a fragmentary side view showing the relative positions of component parts of one of the aforesaid staple-forming and driving mechanisms S at about the time of operation of the wire-severing mechanism of Figs. 9 and 10;

Fig. 13 shows the same parts or elements as Fig. 12 in their positions for beginning of formation of a staple;

Fig. 14 illustrates the positions of the same parts as Figs. 12 and 13 at the end of the staple-forming operation and beginning of the staple-driving operation;

Fig. 15 illustrates the positions of the same parts as Figs. 12 to 14 at a later time in the cycle subsequent to operation of the wire-feeding mechanism (77) of Fig. 5A;

Fig. 16 illustrates a still later position of the parts shown in Figs. 12 to 15 and with the staple partly driven through the assembly of signatures;

Fig. 17 illustrates the position of the parts shown in Figs. 12 to 16 at the end of the staple-driving operation;

Fig. 18 is a plan view, on enlarged scale, of clinching mechanism shown in Fig. 5, (see elements 115, 116, 118) with the parts in the positions assumed before their clinching operation upon the staple driven through an assembly by the mechanism of Figs. 12 to 17;

Fig. 19 shows the same parts as Fig. 18 but in their positions at the end of their staple-clinching operation.

Referring to the drawings, a chain conveyor 10, continuously driven at substantially constant speed by any suitable means, such as drive shaft 12, Fig. 2, by its longitudinally spaced lugs or pins 14 moves assemblies, such as A, A1, A2, A3, A4, etc., in succession to the left, Fig. 1, to, through and beyond a stage or region in which their leaves and/or signatures are stitched, stapled or equivalently bound together, to constitute assembly units of books, magazines, pamphlets, or the like.

While aspects of my invention are applicable in the case where the loose signatures of but a single assembly at a time are stitched (which term comprehends also stapling and equivalent binding operations) in the aforesaid stage, groups of two or more assemblies may simultaneously be stitched. In the example herein more particularly described, two such assemblies are at the same time stitched. For example, the leaves and/or signatures of assemblies A3, A4 are still unbound or loose; the pair of assemblies A1 and A2 are, in Fig. 1, shown in the stitching stage; and assembly A is the second of a preceding pair whose stitching has been completed and is passing to delivery or to any other apparatus or system in which one or more other book-making operations may be performed, such, for example, as to a book-covering or cover-applying unit which ordinarily is the practice, though a cover may accompany the loose signatures of each assembly arriving at the aforesaid stage and be simultaneously stitched with the signatures to form a covered stitched assembly.

As indicated in Fig. 1, the backs of the assemblies, where the stitching, as usual, is effected, are lowermost, as they are moved between guide members 15 with their backs resting and sliding upon guide plates 19, C1, C2, or the like.

Though conveyer 10 may form a part of and continue from and to signature-gathering and cover applying systems (not shown), its present function is to advance the assemblies through the stitching stage at a new high speed conforming with the higher output, in stitched assemblies per minute, procured in accord with the present invention.

Disposed in the path of conveyer 10 is a stitching unit or mechanism comprising a carriage C upon which are supported mechanisms for performing in aforesaid stage various stitching and correlated operations; for example, one mechanism serves to clamp one or a plurality of assemblies while moving; another, after cutting off predetermined lengths of wire from spools thereof, forms one or more wire staples and thereafter drives them through each assembly; and another mechanism clinches the staples tightly against the assembly. Of these operations, at least the most significant ones of assembly-clamping, staple-driving and staple-clinching are performed within the forward or working stroke of carriage C, and, as later appears, materially before the end of the working stroke.

To perform the aforesaid operations, while the conveyer 10 and the assemblies are moving at uniform speed, the carriage C is moved forward and backward along and adjacent the path of conveyer 10 on a pair of tracks 17 and 18 on stationary frame F. Preferably rollers or slider blocks 17a and 18a on the carriage ride between their opposite parallel sides.

From opposite ends of the carriage C there extend guide plates C1 and C2 on which the backs of the assemblies slide. The guide plate C1, of U-shape, partly embraces a U-shaped guide plate 19, Figs. 1 and 3, upon which the assemblies are supported and slide as they are moved into the stitching stage. The guide plate C2, of U-shape, nests with a U-shaped guide plate 20 arranged to receive the stitched assemblies after they have passed through the stitching mechanism.

More specifically, the assembly A has received its staples 16, assemblies A1 and A2 are in positions to receive their staples; thereafter their place is taken by assemblies A3 and A4, and after the latter have been stitched a new group of assemblies is moved into the stitching stage.

The carriage C performs one forward and one return stroke for each of its cycles or for each cycle of the herein described machine or apparatus; one of its strokes, that in the direction of movement of the assemblies, is accomplished within one part, the working portion, of the cycle of the machine and of the total cycle of the carriage, and its return stroke is effected within the remainder, the idle portion of the cycle.

It is characteristic of my invention that there is material or great disparity between the durations of working and idle portions of the cycle of the carriage or the machine; the working portion of the cycle is materially shorter than the idle portion; and by performing the various stitching and related operations within the short working portion of the cycle, the output of bound assemblies per minute can be materially increased over prior practice, both when a single assembly is stitched per cycle of the carriage or machine and when two or more assemblies are simultaneously stitched.

The relatively long idle portion of each cycle of the carriage or machine affords ample time for removal of a group of stitched assemblies, A1 A2 for example, from the stitching stage, and replacement thereof in that stage by the next group of unstitched assemblies, A3 A4 for example, so contributing to or effecting increased output of stitched assemblies per unit of time, in accord with increased speed of conveyer 10.

A contribution to increase in output because making feasible a further increase in speed of conveyer 10 is effected by performing the assembly-clamping and the staple-driving and clinching operations, well before the end of the working portion of the cycle of the carriage, as hereinafter more particularly described.

Though any suitable mechanism may be utilized to procure the material disparity between aforesaid working and idle portions of the cycle, in the preferred form of my invention, that mechanism may have the following structural aspects.

A sprocket gear 20, Fig. 2, secured to aforesaid drive shaft 12, continuously drives a sprocket chain 21 which in turn drives sprocket gear 22 secured to shaft 23. The speed of chain 21 in feet per minute is such, with relation to the speed of conveyer 10, that (taking into consideration the gear ratios of the below described mechanism for actuating carriage C) the carriage completes its forward and return strokes, one complete cycle, in a time equal to that required by conveyer 10, for one cycle of the machine, to move a group of assemblies into, through and to the end or out of aforesaid stitching stage. A gear 24 secured to shaft 23, drives a gear 25 secured on shaft 26, which in turn drives bevel gear 27 with which meshes gear 28 secured on shaft 29, to which is secured a disk 30 rotated in clockwise direction, as viewed in Figs. 1 and 2. A round pin 31, Figs. 1 and 3, secured to the disk 30 at suitable distance from its center, engages in a round hole in and drives a slide block 32 arranged to reciprocate within and longitudinally of slot 33 in a lever or arm 34 pivoted at its one end by pin 35 to stationary frame F. The opposite free end of lever 34 is pivoted by pin 36 to a link 37 pivoted at 38, Figs. 1, 2 and 6, to an extension 39 of the carriage C.

In Fig. 1 the carriage C is shown about midway of its working stroke. As the driving pin 31, whose center describes a circle 40, is moved in clockwise direction, Fig. 1, it acts through slider block 32 to move lever 34, link 37, and carriage C to the left in the direction of movement of the assemblies. The limit of this forward movement, the end of the working stroke, is reached when the parts are in positions such that an imaginary straight line 41 tangent to circle 40 passes through the centers of pins 31 and 35. Further clockwise movement of the disk 30 initiates the return stroke, the idle part of the cycle, whose duration is about 213° of rotation of disk 30, at which time the parts have assumed positions such that an imaginary straight line 42 tangent to circle 40 passes through the centers of pins 31 and 35. The line 42 extending to the right, and the line 41 extending to the left of the vertical position of lever 34, are taken as representative of the longitudinal center line of lever 34, when at its right and left limits, Fig. 1.

For convenience, the beginning of the cycle is assumed to correspond with that position of lever 34 indicated by line 42. This position of lever 34, in terms of rotation of the disk 30, represents zero degrees in the carriage cycle. As the disk 30 rotates from its position corresponding with aforesaid zero degree point of the cycle, the carriage C begins its next working stroke which is completed in about 147°, the duration of the working portion of the carriage cycle, as indicated in Fig. 8, by the graph 44a. During that working stroke, the velocity or speed of the carriage C is increased as for simplicity indicated by line 43f, accelerating from zero speed and attaining at about 73½° or middle of the forward stroke its maximum speed, which is materially greater than the conveyer speed which in Fig. 8 is approximately indicated by dot-dash line 10; and thereafter the carriage decelerates, as for simplicity indicated by line 43f', to momentary standstill at about aforesaid 147° of the cycle. The velocity or speed of carriage C changes non-linearly and in accord with the laws of simple harmonic motion, though shown in Fig. 8 as a linear change.

During the return stroke, as indicated by line 44, Fig. 8, the speed or velocity of the carriage C is increased, as for simplicity indicated by line 45r, attaining its maximum speed or velocity, materially less than its maximum speed in each working stroke and less than the conveyer speed, at about 253½° of the cycle, and then decelerates, as for simplicity indicated by line 45r', to momentary rest at the end of the cycle or the beginning of the next cycle.

With the herein described typical embodiment of my invention, in regular commercial practice, the carriage C completes upwardly of 80 and as high as 90 cycles per minute, which, when stapling groups of assemblies two at a time, yield a new high output of about 160, and as high as 180 or more stitched assemblies per minute.

The ratio of duration of the working to that of the idle portion of each cycle, still maintaining the herein described functional disparity between them, may be anything suitable or desirable. The ratio is affected, for example by the radial distance of pin 31 from the axis of rotation of disk 30, and/or by the distance between the axis of disk 30 and the center of pivot 35, other things remaining the same or suitably complementarily changed, as the case may be.

While, as aforesaid, the working portion of the cycle may have a duration corresponding with about 147° thereof, and the idle portion corresponding with about 213°, the working and idle portions of the cycle, in any event and in general, are suitably less and greater, respectively, than one-half cycle or 180°.

The working part of the cycle may, in general, have a duration greater than aforesaid 147°, but less than one-half cycle, or may have suitable duration upwards of 90° and less than aforesaid 147°; and in each case the longer or idle portion of the cycle will have a duration of 360° less the duration of the working cycle.

This difference between the durations of the working portion and of the remaining portion of each cycle of the carriage or machine, besides permitting a construction in which the length of stroke in either direction of the carriage C is decreased, permits increase in speed of travel of the assemblies through the system or stitching stage, with proportionate increase in output, even when stitching assemblies one at a time per cycle; and the output so increased is further increased when, as shown and preferred, a group of two or more assemblies at a time are stitched, the duration of the idle portion of the cycle affording time for removal of one group of assemblies from the stitching stage and replacement thereof in that stage by a succeeding group of assemblies.

For example, in prior practice, with a given spacing between conveyer pins 14 longitudinally of the conveyer 10, the linear speed of the conveyer is about 145 feet per minute for an output of about 110 stitched assemblies per minute, when performing the stitching operations on one assembly at a time, with substantial equality of durations of the idle and working portions of each cycle.

When, however, in accordance with the present invention, the working part of the cycle is of materially shorter duration than the idle portion, and preferably with the assembly-clamping and staple-driving and clinching operations performed well before the end of the working or forward stroke of the carriage C, the speed of the conveyor 10 may be materially increased, and thereby procure correspondingly materially higher output. More particularly, applying the present invention to the case when two assemblies at a time are stitched, and with the spacings between pins 14 the same as in the above example of prior practice, and with aforesaid inequality between the durations of the working and idle portions of each cycle, the speed of the conveyer 10 may be materially further increased, yielding an output of about 160 to 180 or more stitched assemblies per minute.

Otherwise stated, the output in stitched assemblies per minute, whether stitching one or a plurality of assemblies at a time, when the working stroke of the carriage C is performed in about 147° of a cycle, is increased about 22½%, and may range from a lesser percentage up to 100%, for which last figure the working part of the cycle is 90° or one-quarter of a cycle of the machine or carriage C.

While stapling assemblies in groups thereof two or more at a time, there are provided on carriage C stitching mechanisms, later to be described, for two or more assemblies, and assembly clamps corresponding in number with the number of stitching mechanisms.

Assuming the carriage C is at its right-hand limit, Fig. 1, the beginning of a cycle: After about 23° of rotation of the disk 30, movable clamping jaws 46, one for each assembly, Figs. 5 and 6, begin their movement to their clamping positions, as indicated at 46a, Fig. 8, to hold securely assemblies A1 and A2, Fig. 1, against stationary jaws 47, Figs. 5 and 6. The jaws 46 are moved to closed position, under the control of cams 50, by plurality of tension springs 47a which act through cranks 48, Fig. 4, pivoted at 49, normally to bias them toward assembly-clamping positions. Bifurcated arms 48a of each crank, Figs. 1 and 4, support rollers 48r which bear against cams 50, while the opposite bifurcated arms 48b of each crank 48 support a rod 51, preferably square in cross-section. One end 52a of a crank 52, Fig. 6, pivoted on and movable with the carriage C is slidably connected to rod 51. The other arm 52b of crank 52 is connected by pivot pin 53a to one end of a link 53, the opposite end of which is pivoted at 53b to the carriage C. Accordingly, as the springs 47a are permitted by cams 50 to move the arms 48b in a clockwise direction, Figs. 4 and 6, the jaws 46 are moved to the right, Fig. 6, and tightly against the assemblies A1, A2, Fig. 1. During this movement, the pivot pin 53a, Figs. 5 and 6, which forms the knee-pivot of a toggle comprising arm 52b and link 53, is moved slightly over-center, as shown in Fig. 6.

It is to be observed, Fig. 8, the clamps reach their fully closed positions at about 48° of the cycle, and thereafter remain closed, as indicated by line 46b, until at about 104° of the cycle, when they are moved to their open positions, as indicated by the line 46c.

With assemblies to be stapled two at a time, the carriage C attains a speed equal to that of chain conveyer 10 and the assemblies at about 47½° of the cycle, or an instant before the clamps 46, 47 are fully closed. Thereafter the speed of the carriage C further increases until about 73½° of the cycle and it moves the clamped assemblies, for example, A1, A2, ahead of their associated conveyer pins 14 as indicated by gaps X, Fig. 1. The speed of the carriage C from about 73½° of the cycle decreases, again equaling the conveyer speed at about 99.5° of the cycle. In this way the assemblies A1 and A2, because moved ahead of pins 14, are free of the conveyer 10 but retained in fixed position with respect to the carriage C to receive the staples. After the staples have been driven and clinched, in manner later described, the movable jaws 46, by action of cams 50, begin their movements to open positions at 104° of the cycle, and attain their full open positions at 149°. The cams 50 then retain them in open positions until proper time in the next cycle. As the jaws 46 release the assemblies A1 and A2, the conveyer pins 14, then moving at higher speed than carriage C, approach assemblies A1 and A2, engage them at about 117° of the cycle, and move them to the left, Fig. 1, and out of the carriage as the next pair A3 and A4 are moved onto the carriage and into the stitching stage.

Since the forming, driving and clinching mechanisms are identical for the several staples of each assembly, only the mechanisms for one staple are described in detail. And when assemblies are to be stitched in groups of two or more at a time, the operation of the stitching mechanisms for the several assemblies of a group are identical. Wire-feed track 54, Fig. 2, supported from the frame F, cooperates with a roller (not shown) supported by the carriage C to operate wire-feeding mechanism, such as shown in Fig. 5A and later described, to advance lengths of wire for the formation of one of the staples for the assembly A1.

The mechanism for forming the aforesaid lengths of wire into staples for assembly A1 is driven from an inclined track 55, Fig. 2, supported on the frame F while the mechanism for driving the staples is in part actuated from an inclined track 56.

Similarly, for the second assembly A2, and with reference to which the operations will be pointed out in detail, a wire-feed track 57, and inclined track 58 for controlling the staple former, and inclined track 59 forming a part of the staple-driving mechanism, are supported from the frame F. The tracks 56 and 59 are respectively pivoted at 56a and 59a for movement in clockwise direction, Fig. 2, as effected by means of cams 60 and 61, respectively, and crank arms 62 and 63, respectively, pivoted at 64, 64. As the crest 61a of cam 61, Fig. 4, engages a roller 63r supported at one end of crank 63 the opposite end 63a of which is thereby rotated against the outer free end of track 59 to move it in clockwise direction, Fig. 2, against the bias of tension spring 65. The track 56 is likewise moved against the bias of a tension spring 66 by the crest of cam 60 and crank 62, the movements of each of said tracks being provided to assist in driving the staples through the assemblies.

It is to be observed predetermined portions of tracks 56 and 59 are inclined with respect to the longitudinal path of the carriage C, while their remaining portions 56b and 59b are disposed parallel with that path of movement, for purposes later explained.

Referring to Fig. 5, wires 71, 72 and 73, from storage reels R1, R2 and R3 therefor, pass through straightening rollers 74, 75 and 76, wire-feeding mechanisms 77, 78 and 79, guide tubes 80, 81 and 82 and into wire-severing mechanisms, of which 83 and 84 are shown.

The wire-feeding mechanisms 77–79 are supported on a plate 88 slidably carried on rods 89 and 90 of the carriage C; an extension 88a of said plate carries a roller 91 biased by spring 91a against the wire-feeding track 57.

Since, as indicated above, the operation is identical, not only for the formation of the several staples for the assembly A2, but also for those of assembly A1, the following description will be limited to the complete operations for one staple.

As the carriage C is moved forward, in the working part of the cycle, the plate 88 is moved to the left, as viewed in Fig. 5. By means of friction members 92 and 93, carried by springs 94 and 95, Fig. 5A, themselves secured to plate 88, the wire 71 is moved forward, to the left, from reel R1 a distance corresponding to the length of wire required for the formation of a staple.

Thereafter, and preferably, at the end of the working stroke of carriage C, the new length of wire is cut off by the severing mechanisms 83. The cutter or blade 83a of the severing mechanism is actuated through a link 97, Fig. 6, pivoted to one arm 98a of a crank 98, pivoted at 99, the other arm 98b of which extends downwardly, Fig. 6, into engagement with a stationary cam 100, Fig. 5, integral with or mounted on stationary frame F. The movement of the outer or free end of arm 98b over stationary cam surface 100, as the carriage is returning to its initial position, rotates the crank 98 in a clockwise direction, Fig. 6, to move the blade 83a in direction to cut the wire at the point where it passes the edge, Fig. 9, of an extension 96a of a member 96 secured to the carriage.

The central portion of the severed length of wire 71a, Fig. 11, lies within a recess, open at the bottom, provided in a block 101 itself supported and biased downwardly by a leaf spring 102 toward driver 104, while the end portions of wire 71a engage the sides of former block 105. The recess in block 101 is just deep enough so that the bias of the spring 102 is applied to wire 71a and against the former block 105. The wire 71a is thereby held in place within the recess of block 101.

The driver 104 is slidably mounted within longitudinally aligned slots or recesses 104a, Fig. 11, in a staple-forming block 105, and also in a pair of plates 103 secured to that portion of the carriage C which is disposed directly below the path of the assemblies. The stationary plates 103 cooperate with the movable jaw 46 of the clamp 46, 47, in effect forming a part of the stationary jaw.

During the idle part of the cycle, the return stroke of the carriage, the driver 104, as shown at 104f, Fig. 8, is moved to its outer limit, Fig. 14. At about the same time, as shown at 105a, Fig. 8, the staple-forming block 105 supported on former plate 106, is, by the inclined track 58, Fig. 5, and a roller 107 carried by an extension 106a of plate 106, moved from its forward or left limit, Fig. 12, to its rear or right limit, Fig. 13. At its right limit, Fig. 13, notches 108 in former block 105 register with the length of wire 71a so that spring 102 is effective to move it downwardly into notch 108, which comes to rest in alignment with the slots or recesses 104a provided for the driver 104.

As shown in Fig. 8, this return movement of the former block 105 occurs during that portion of the cycle indicated at 105a. Thereafter, and during about the first 35° of the cycle, the former block 105 is by track 58 and roller 107 moved to the left from its position shown in Fig. 13 to form the staple. The block 101, disposed between opposite portions of the block or staple former 105, holds the intermediate portion of the severed length of wire 71 stationary, while the movement of the staple-forming block or former 105 to the left bends the ends of wire 71a forwardly, to the left, Figs. 13 and 14, and into the recesses 104a. The resulting U-shaped staple 71a is supported in the slots or recesses in which the driver 104 is slidably mounted.

The former block 105 continues its movement to the left, as indicated at 105b, Fig. 8, until it is again returned to its leftmost position, and with its slots or recesses 104a registering with those of plates 103, Figs. 12 and 14, in which relation it is retained by that portion 58a of track 58 parallel to the path of carriage C from about 60° to about 280° of the cycle, as indicated at 105c, Fig. 8.

The driver 104, as indicated at 59c and 104c, Fig. 8, is moved "in" or to the left, Figs. 11–17, the first part of its movement being produced alone by inclined track 59 within which the roller 109 of the driver-actuating plate 110 is disposed.

As the leading, beveled, end of the driver 104 engages the inclined surface of block 101, the latter is raised until it rides upon the upper surface of the driver 104, as indicated in Figs. 12, 15–17. The block 101 is then in position to receive the length of wire required for the formation of the next staple, i. e. the one to be driven into the assembly A4, Fig. 1, in the next cycle.

The movement of driver 104 to the left is continued until U-shaped staple 73a has been fully driven into and through the assembly A2. To prevent bending of the opposite legs of the staple 17a while so driven, a curved sharp-pointed block 111, pivoted at 11a, and biased downwardly by a rod 112 and a spring 113, Fig. 6, nests between, and prevents inward bending of, legs of the U-shaped staple 71a. The configuration of block 111 is such that it supports all portions of the legs of staple 71a until fully driven through the assembly A2. The cross portion of the staple is by the driver 104 pressed against a curved portion or cam surface 111c of block 111 to produce clockwise movement, Figs. 11–17, of block 111 during the actual driving of the staple into the assembly.

As best shown in Figs. 11, 15–17, the block 111 is progressively moved upward as the staple 71a is dirven into assembly A2. In this manner, those portions of the legs of the staple not yet within the assembly A2 receive maximum support from block 111.

As above indicated, the movement of driver 104 to the left (Figs. 5, 6, 11 and 12 to 17) is obtained by the movement of roller 109 relative to and as determined by the inclined portion of track 59. In order to move the driver 104 at high speed during its staple-driving operation, a quick pivotal movement of the track 59 about its pivot 59a is produced by engagement of the crest 61a of cam 61, Fig. 4, with roller 63r of crank 63 at about 61° of the cycle. As shown at 104c, Fig. 8, the effect 61b of cam crest 61a, Fig. 4, is superimposed upon that of the track 59 to complete the staple-driving operation at about 90° of the cycle. The short period of dwell 61c, Fig. 8 (as caused by crest 61a of cam 61, and by roller 109 in its motion in that part of track 59 which is parallel to the path of carriage C) is provided for the clinching operations later described. The effect of the track 59 alone upon the driver movement is shown at 59c, 104e and 104f, Fig. 8, while the combined effects of track 59 and cam 61 are shown at 61c, 104c and 104d. In short, the driver 104 acts quickly to thrust the staple 71a through the assembly and into the position indicated in Figs. 17 and 18.

Actually Figs. 18 and 19 are fragmentary plan views of the leftmost staple, Fig. 1, driven through assembly A1. Since the parts and operations are identical, however, the reference character 71a has been applied to the staple shown in Figs. 18 and 19.

As the open ends of the staple 71a pass beyond the left side of the assembly, Fig. 18, they strike pivoted clincher elements 115 and 116 restrained by a member 118 against movement under the influence of associated tension springs 119 and 120, thereby bending the ends of staple 71a inwardly toward each other in preparation for the clinching operation, which latter is initiated at about 98° of the cycle, as indicated at 115c of Fig. 8.

At this time, a plunger 122 slidably mounted on the carriage C and biased outwardly therefrom by a spring 123 and rod 123a strikes a stationary stop 124 carried by the stationary frame F. Further forward movement of the carriage C, Figs. 17 and 19, moves one end of a crank 125, pivoted on the carriage at 126, against a cam surface 122a. This surface rotates crank 125 in a clockwise direction, Figs. 18 and 19, the other end thereof actuating a slidable member 129 which, through a toggle link 130, moves the member 118 to the right and against the clinching elements 115 and 116. These elements, as shown in Fig. 19, bend the outer ends of the staple 71a inwardly, toward each other, and against the assembly.

It is to be observed the driver 104 has driven the closed end of the staple 71a a short distance into the assembly beyond its outermost plane; similarly the clinching elements 115, 116, force the open ends of the staple into the assembly and slightly beyond the outer plane of the other side of the assembly. In this manner, each staple tightly holds or binds the signatures of each assembly together.

As indicated at 115c and 115d, Fig. 8, the clinching operations are accomplished in a very small fraction of the working part of the cycle, for example, about 10°.

A quick release of clinching elements 115 and 116 is effected by the movement of the movable jaw 46 of the clamp to open position. This movement is obtained by an abrupt change of contour of cam 50, as indicated at 50a, Fig. 4. As the jaw 46 is moved to the left, Figs. 5, 18 and 19, it carries with it the member 129 and the clinching elements 115 and 116 because they are mounted within slots and recesses formed in said clamping jaw.

As soon as the open ends of the staple 71a have been clinched, the cam 61, as indicated at 104d, Fig. 8, produces movement of the driver 104 away from the staple. The driver is by the portion 59b of track 59 retained in its last-named position during the remainder of the working part of the cycle. Thereafter, the driver returns as indicated at 104e and 104f, Fig. 8, to its original position. The contour of cam 61 as indicated by 61d and 61e, Fig. 8, does not affect the movement of driver 104.

The quick withdrawal of the driver and of the clinching elements is essential since they are moved into positions within the outermost planes of the assembly; unless removed from that position as the clamps 46, 47 are released, relative movement between them and the assembly would result in tearing its outermost leaves. As soon as the clamp 46, 47 is opened the forces exerted by the tightly compressed signatures of each assembly move the staples a slight amount from the positions to which they have been driven by driver 104 and clinching elements 115 and 116.

In accord with my invention, however, there is ample time within which to remove the driver 104 and the clinching elements 115 and 116, even through the speed and output of the machine are materially increased over that possible with apparatus common in prior practice.

Identical mechanisms operate simultaneously, with the ones just described, to form staples from the wires 72 and 73, to drive them through, and to clinch them against, assembly A1 at different points along its back edge.

As shown in Fig. 5, the wire-feed plate 88, the driver plate 110, the former plate 106 and clamp 46, 47 are common to each of the mechanisms associated respectively with the several wires 71–73, and they may, if desired, also be common to the mechanisms for forming, driving and clinching the staples for the assembly A1; or these plates and clamp may be duplicated in a mechanism identical with that shown in Fig. 5, and they may be actuated by the wire-feed track 54, the inclined track 56, the inclined track 55, and the respective cams 50 and 60 and their associated cranks.

The larger part of the stitching mechanism being mounted to the right of the path of the assemblies, Fig. 5, there is provided to the left of them, a track F3 on which slides a block C4 carried by rods 89 and 90, for the right-hand stitching mechanism, Figs. 5 and 6; similarly a slide block C5 is provided for the left-hand stitching mechanism, Fig. 1; the block C5 is carried by rods 132 and 133 forming a part of the carriage C, and slides on track F3.

Again referring to the operation, it will be recalled that the block 101 is, by the driver 104, moved into its elevated position, Fig. 15, early in the beginning of each cycle. Thereafter, and as indicated at 77c, Fig. 8, the wire-feeding elements 92 and 93, Fig. 5, are moved by the track 57 to pull from roll R1 enough of wire 71 for the formation of the next staple, and to move that amount of wire into the recess of block 101.

Simultaneously, wires 72 and 73, and the wires (not shown) for assembly A1 are fed into similar blocks, preparatory to the formation of the staples for the next pair of assemblies A3 and A4 to be stitched.

During the aforesaid stitching operations the carriage C has continued to move to the left, Fig. 1, has attained a speed greater than and leads the conveyer 10 and its pins 14. As the jaw 46 of the clamp is released, however, at about 104° of the cycle, Fig. 8, the speed of carriage C is again about equal to the speed of the conveyer 10. Shortly thereafter the speed of carriage C continues to decrease, with the result that the pins 14 begin to overtake the assemblies A1 and A2 and reengage them at about 117° of the cycle, and thereafter continue to move the assemblies at conveyer speed away from carriage C and off of its guide plate C2 onto stationary guide plate 20, and beyond the stitching stage.

The carriage C continues to decelerate and attains momentary standstill at 147° of the cycle; it is then returned to its original position during the idle part of the cycle, attaining therein a maximum speed at about 253½° of the cycle, and then continues to decelerate to momentary standstill at the end of its cycle, at which time it will be at its limit to the right of its position shown in Fig. 1. As the next cycle begins the carriage C is again moved to the left for its working stroke.

The relation between the movements of the carriage C and the conveyer 10 is such that the group of assemblies A1, A2 is removed from the stitching stage and the next group, for example, assemblies A3, A4, is moved into proper position in that stage to be engaged by their clamps 46, 47, whereupon the stitching operations described above are again performed.

In a typical commercial embodiment of my invention, the carriage, having a stroke of about 8½ inches, when stitching two books at a time, completes about 80 to 90 cycles per minute, yielding an output of stitched or stapled assemblies of about 160 to 180 per minute.

If assemblies are stitched one at a time, in accord with my invention materially greater output is obtained by producing a working stroke for the carriage of materially shorter duration than its return stroke; and this higher output is permitted or contributed to by performing the stitching operations materially in advance of the arrival of the carriage at the end of its working stroke as above described.

The stitching operations, already described, in terms of the inclined tracks 58 and 59, Fig. 7, and the graphs of Fig. 8, may be summarized as follows: At the beginning of the cycle or the beginning of the working stroke of the carriage the driver 104 is in its rightmost position, a length of wire 71a has been fed, and the former block 105 is in position to be moved to the left, Fig. 7, to form the staple. After about 35° of the cycle, the inclined track 58 has moved the block 105 to form the staple. At the "End of former stroke", Fig. 7, the driver 104, as indicated at 104m, is in position to start to drive the staple toward the assembly, and engages the assembly, as indicated by the legend "Stitch about to enter assembly", just prior to the time the operating roller 109 of the driver plate 110 reaches the end of the inclined part of track 59.

The staple-driving stroke of driver 104 is begun before and completed very shortly after the roller 109 enters into that part 59b of the track 59 which is parallel to the path of the carriage. Supplemental control of the driving movement of the driver 104 is produced by cam 61, Fig. 4, which moves the track 59 from its full line position to its broken line position, Fig. 7, quickly and positively to drive the staple 71a through the assembly A2. During the movement of roller 109 along that part 59b of track 59 which is parallel to the path of the carriage C, the clinching elements 115, 116 are actuated by cam surface 122a, Figs. 18 and 19, to clinch the staples. Immediately thereafter the cam 50 releases the clamp 46, 47 and bodily moves the clinching elements 115, 116 away from the assembly. At the same time the driver 104 is by cam 61 moved away from the assembly A2.

The staple-driving and clinching operations are performed, in the example illustrated and without limiting my invention thereto, when the carriage has progressed, after the assembly has been clamped, to a region approximately 60% to 70% of its working stroke. Traverse of that part 59b of track 59 which is parallel to the path of the carriage C by roller 109, after completion of the staple-driving stroke of driver 104, does not further affect driver 104, which, by roller 109 and control of the track 59 by cam 61 is slightly withdrawn from the now stapled assembly; and the staple former member 105, after completion of its staple-forming operation, remains in its leftmost position, Figs. 14–17, for the remainder of the working cycle of the carriage.

Increase in output of stitched assemblies per minute, when stitching either one or a plurality of assemblies at a time, is contributed to by performing, during the period in which an assembly is held clamped, for example from about 48° to about 104°, Fig. 8, the operations of staple-driving and clinching within a period corresponding, for example, with from about 90° to about 103°, within and adjacent the end of the clamping period. The clamping and staple-driving and clinching periods occur materially and well before the end of the forward or working stroke of the carriage C. By so materially advancing in the forward stroke or working portion of the carriage or machine cycle the assembly-clamping and staple-driving and clinching operations, both the maximum velocity of carriage C within its working stroke and the length of stroke may be and are materially reduced. An assembly is carried or advanced by the conveyer 10 until the speed of the carriage C and the assembly clamp equals that of the conveyer 10, whereupon the assembly is clamped, and is carried ahead of and away from the conveyer pin 14, by the increase speed of the carriage C and the assembly clamp to its maximum at about the middle of the forward stroke of the carriage or middle of the working portion of its cycle. Thereafter the velocity of the carriage and assembly clamp diminishes to the end of the forward or working stroke of the carriage, and after the clamp releases the assembly the conveyer pin 14 overtakes the assembly and thereafter carries it forward at conveyer velocity.

The nearer the end of the forward stroke of the carriage the stitch or staple is driven and clinched the greater is the excess of velocity of the carriage and assembly clamp over that of the conveyer pin 14 at mid-point of the forward or working stroke. In consequence, by advancing in the forward or working stroke of the carriage the time when the clamping, stitching and clinching operations are performed, the maximum speed of the carriage C, occurring about the mid-point of its forward or working stroke, may be and is materially less than the case where those operations are performed near the end of the working stroke; and as a result the length of stroke of the carriage may be and is reduced, and the assembly is and need be advanced while clamped a lesser distance ahead of the conveyer pin 14, so saving time within the forward stroke of the carriage, and so contributing to increase in output per unit of time. These aspects and characteristics of my invention increase the output of stitched units per minute in addition to the increase in output effected by the material disparity between the durations of the working and idle portions of the carriage cycle.

When the stitch or staple-driving and clinching operations have been completed, the carriage is required to complete the considerable and material remainder of its forward or working stroke; but the stitch or staple driving having been completed (at a time corresponding approximately with the position of roller 109 adjacent the junction of the inclined portion of track 59 with its portion 59b parallel with the path of the carriage) that portion 59b of the track insures that there will be no movement of the stitch driver 104 in either direction transversely of the path of the carriage. In consequence the track parts 56b and 59b parallel with the path of the carriage, and the lengths or extents of those parts, are directly and functionally related to the materially earlier performance of the stitch-driving operation in the forward or working stroke of the carriage; and so said parts 56b and 59b cooperate in ensuring aforesaid reduction in the maximum velocity of the carriage, and reduction in the length of its stroke.

While I have shown a particular embodiment of my invention, it will be understood that I do not limit myself thereto, and I therefore contemplate by the appended claims to cover any such variations and modifications as fall within the spirit and scope of my invention.

What I claim is:

1. Apparatus for stitching assemblies of signatures comprising means for continuously conveying assemblies in succession to a stitching stage, cyclically operating mechanism including a carriage, means for causing forward and return strokes of said carriage along the path of said assemblies in each of successive cycles and for imparting to the forward and return strokes durations respectively materially less and greater than one-half of each cycle, stitching mechanism on said carriage, and means for operating said mechanism during said forward stroke.

2. Apparatus for stitching assemblies of signatures comprising means for continuously conveying assemblies in succession to a stitching stage, cyclically operating mechanism including a carriage, means for causing forward and return strokes of said carriage along the path of said assemblies in each of successive cycles and for imparting to the forward stroke a duration upwards of one-quarter and materially less than one-half of each cycle, stitching mechanism on said carriage, and means for operating said stitching mechanism during said forward stroke.

3. Apparatus for stitching assemblies of signatures comprising means for continuously conveying assemblies in succession to a stitching stage, cyclically operating mechanism including a carriage, means for causing forward and return strokes of said carriage along the path of said assemblies in each of successive cycles and for imparting to the forward stroke a duration not exceeding one-half of each cycle, stitching mechanism on said carriage, and means for operating said stitching mechanism during and well before the end of said forward stroke.

4. Apparatus for stitching assemblies of signatures comprising means for continuously conveying assemblies in succession to a stitching stage, cyclically operating mechanism including a carriage, means for causing forward and return strokes of said carriage along the path of said assemblies in each of successive cycles and for imparting to the forward stroke a duration upwards of one-quarter and materially less than one-half of each cycle, stitching mechanism on said carriage, and means for operating said stitching mechanism during and well before the end of said forward stroke.

5. Apparatus for stitching signature assemblies at least two at a time comprising means for continuously conveying groups of two or more assemblies in succession to a stitching stage at a rate of at least one group per cycle of cyclically operating mechanism including a carriage, means for causing forward and return strokes of said carriage along the path of said assemblies in each of successive cycles and for imparting to the forward and return strokes durations respectively materially less and greater than one-half of each cycle, a stitching mechanism on said carriage for each of the assemblies of a group, and means for substantially simultaneously operating said stitching mechanism during said forward stroke.

6. Apparatus for stitching signature assemblies at least two at a time comprising means for continuously conveying groups of two or more assemblies in succession to a stitching stage at a rate of at least one group per cycle of cyclically operating mechanism including a carriage, means for causing forward and return strokes of said carriage along the path of said assemblies in each of successive cycles and for imparting to the forward stroke a duration not exceeding one-half of each cycle, a stitching mechanism on said carriage for each of the assemblies of a group, and means for substantially simultaneously operating said stitching mechanism during and well before the end of said forward stroke.

7. Apparatus for stitching signature assemblies at least two at a time comprising means for continuously conveying groups of two or more assemblies in succession to a stitching stage at a rate of at least one group per cycle of cyclically operating mechanism including a carriage, means for causing forward and return strokes of said carriage along the path of said assemblies in each of successive cycles and for imparting to the forward stroke a duration materially less than one-half of each cycle, a stitching mechanism on said carriage for each of the assemblies of a group, and means for substantially simultaneously operating said stitching mechanism during and well before the end of said forward stroke.

8. Apparatus for stitching assemblies of signatures comprising means for continuously conveying assemblies in succession to a stitching stage, cyclically operating mechanism including a carriage, means for causing forward and return strokes of said carriage along the path of said assemblies in each of successive cycles and for imparting to the forward stroke a duration not exceeding one-half of each cycle, assembly-clamping means on said carriage, staple driving and clinching mechanism on said carriage, means for operating said clamping means, and means for operating said driving and clinching mechanism while an assembly is held by said clamping means and well before the end of said forward stroke.

9. Apparatus for stitching assemblies of signatures comprising means for continuously conveying assemblies in succession to a stitching stage, cyclically operating mechanism including a carriage, means for causing forward and return strokes of said carriage along the path of said assemblies in each of successive cycles and for imparting to the forward stroke a duration materially less than one-half of each cycle, assembly-clamping means on said carriage, staple driving and clinching mechanism on said carriage, means for operating said clamping means, and means for operating said driving and clinching mechanism while an assembly is held by said clamping means and well before the end of said forward stroke.

10. Mechanism for stitching assemblies comprising the combination of means for moving assemblies along a predetermined path, a carriage reciprocable along said path, means supported by said carriage for stitching together the signatures of an assembly, and means for moving said carriage in the direction of travel of said assemblies at an average speed materially higher than that of its return movement.

11. Mechanism for stitching together the signatures of assemblies comprising means for conveying assemblies in succession along a predetermined path and through a stitching stage, cyclically operating mechanism including a carriage, means for causing within said stage forward and return strokes of said carriage along the path of said assemblies in each of successive cycles and for imparting to the forward and return strokes durations respectively materially less and greater than one-half of each cycle, stitching means on said carriage, and means for causing operation of said stitching means to bind together the signatures of an assembly during each of said forward strokes.

12. Mechanism for stitching together the signatures of assemblies comprising means for conveying assemblies in succession along a predetermined path and through a stitching stage, a cyclically operating mechanism including a carriage, means for causing within said stage in each of successive cycles forward and return strokes of said carriage along the path of said assemblies and for imparting to the forward and return strokes durations respectively materially less and greater than one-half of each cycle, stitching means on said carriage, and means for causing operation of said stitching means to bind together the signatures of an assembly during, and well in advance of the completion of, each forward stroke.

13. Mechanism for stitching together the signatures of assemblies comprising means for continuously conveying assemblies in succession along a predetermined path and through a stitching stage, a carriage reciprocable within said stage along said path, means supported by said carriage for stitching together the signatures of one or more assemblies, and means for moving said carriage in the direction of travel of said assemblies within about 147° of the cycle of the mechanism to produce an average speed of said carriage within said 147° materially higher than in its return movement.

14. Mechanism for binding together the signatures of assemblies, at a rate within the range up to about 180 per minute, comprising means for continuously conveying assemblies in succession along a predetermined path and through a stitching stage, a carriage reciprocable within said stage along said path, means supported by said carriage for simultaneously driving staples through, and thereafter clinching them against, at least two assemblies at a time, means for moving said carriage in the direction of travel of said assemblies within about 147° of a cycle of the mechanism to produce during a material portion of said 147° of the cycle a speed of said carriage materially in excess of that of said conveying means, means operable as the speed of said carriage first approaches equality with that of said conveying means for clamping said assemblies and for advancing them with respect to said conveying means, and means for actuating said driving and clinching means within about fifty-five to about seventy-five degrees of said cycle during the time said assemblies occupy their said advanced positions with respect to said conveying means.

15. Mechanism for stitching together the signatures of assemblies comprising means for conveying assemblies in succession along a predetermined path and through a stitching stage, a carriage, means for causing within said stage forward and return strokes of said carriage along said path in each of successive cycles and for imparting to the forward and return strokes durations, respectively, materially less and greater than one-half of each cycle, stitching means on said carriage including a stitch-driving element, means for actuating said driving element comprising a track having one portion inclined with respect to said predetermined path and another portion extending parallel to said path, and means operable by said inclined portion of said track to move said driving element to its stitch-completing position, and by said parallel portion of said track maintaining, during about the last quarter of the forward stroke of said carriage, said driving element slightly retracted from its said position.

16. Mechanism for stitching together the signatures of assemblies comprising means for conveying assemblies in succession along a predetermined path, a carriage, means supporting said carriage for reciprocable movement along said path, means for moving said carriage in one direction at average speed materially higher than in the other direction comprising a slide block movable in a circular path, a lever pivoted at one end and engaged by said slide block for oscillation thereof between predetermined limits, and linkage for converting said oscillatory movement of said lever into reciprocatory movement of said carriage.

HARRY W. FAEBER.